US011991061B2

(12) United States Patent
Scahill et al.

(10) Patent No.: US 11,991,061 B2
(45) Date of Patent: May 21, 2024

(54) PROCESSING LOCAL AREA NETWORK DIAGNOSTIC DATA (71) Applicant: BRITISH TELECOMMUNICATIONS PUBLIC LIMITED COMPANY, London (GB)

(72) Inventors: Francis Scahill, London (GB); Simon Ringland, London (GB); Timothy Twell, London (GB)

(73) Assignee: British Telecommunications Public Limited Company (GB)

( * ) Notice: Subject to any disclaimer, the term of this patent is extended or adjusted under 35 U.S.C. 154(b) by 13 days.

(21) Appl. No.: 17/250,242

(22) PCT Filed: Jun. 21, 2019

(86) PCT No.: PCT/EP2019/066513
§ 371 (c)(1),
(2) Date: Dec. 21, 2020

(87) PCT Pub. No.: WO2020/002159
PCT Pub. Date: Jan. 2, 2020

(65) Prior Publication Data
US 2021/0160161 A1 May 27, 2021

(30) Foreign Application Priority Data

Jun. 25, 2018 (EP) ..................................... 18179579

(51) Int. Cl.
*H04L 43/0817* (2022.01)
*H04L 43/04* (2022.01)
(Continued)

(52) U.S. Cl.
CPC .......... *H04L 43/0817* (2013.01); *H04L 43/04* (2013.01); *H04L 43/06* (2013.01); *H04L 43/10* (2013.01)

(58) Field of Classification Search
CPC ..... H04L 43/0817; H04L 43/04; H04L 43/06; H04L 43/10
(Continued)

(56) References Cited

U.S. PATENT DOCUMENTS 6,041,351 A * 3/2000 Kho ........................ H04L 29/06
709/219
7,460,476 B1 12/2008 Morris et al.
(Continued)

FOREIGN PATENT DOCUMENTS

CN 106576057 A 4/2017
CN 107409071 A 11/2017
(Continued)

OTHER PUBLICATIONS

Extended Search Report for European Application No. 19200631.0 dated Jan. 22, 2020, 10 pages.
(Continued)

*Primary Examiner* — Meng Vang
(74) *Attorney, Agent, or Firm* — Pranger Law PC (57) ABSTRACT Methods and apparatus are disclosed for processing local area network diagnostic data obtained in respect of a local area network. The method includes calculating a value for each of a plurality of data units according to a predetermined function of one or more field-values stored in the data unit; identifying a first and second data unit as being similar in dependence on a comparison of their respective values, the second data unit having at least one field-value which differs from a corresponding field-value of the first data unit; in response to such an identification, creating a third data unit containing a field-value indicative of the first data unit and an indication of the at least one field-value which differs from the corresponding field-value in the first data unit; and
(Continued)

sending the first and third data units for performance analysis at a remote network diagnostic device outside the LAN.

15 Claims, 4 Drawing Sheets

(51) Int. Cl.
   *H04L 43/06* (2022.01)
   *H04L 43/10* (2022.01)
(58) Field of Classification Search
   USPC .......................................................... 709/224
   See application file for complete search history.

(56) References Cited

U.S. PATENT DOCUMENTS

| | | | |
|---|---|---|---|
| 8,874,741 | B2 | 10/2014 | Hassan et al. |
| 9,300,599 | B2 | 3/2016 | Pope et al. |
| 10,757,228 | B1 | 8/2020 | Bhimavarapu et al. |
| 2003/0145076 | A1* | 7/2003 | Procopio ............ H04L 41/5035 709/224 |
| 2004/0221132 | A1 | 11/2004 | Torkelsson et al. |
| 2007/0189174 | A1 | 8/2007 | Hibbert |
| 2007/0189176 | A1 | 8/2007 | Milne et al. |
| 2007/0192474 | A1* | 8/2007 | Decasper ............ H04L 67/306 709/223 |
| 2008/0089357 | A1 | 4/2008 | Park et al. |
| 2009/0281984 | A1 | 11/2009 | Black |
| 2010/0100930 | A1* | 4/2010 | King ................... H04L 63/1433 726/1 |
| 2011/0125898 | A1* | 5/2011 | Hassan .................. H04L 69/40 709/225 |
| 2012/0230186 | A1* | 9/2012 | Lee ..................... H04L 43/0882 370/432 |
| 2014/0040464 | A1 | 2/2014 | Singhal et al. |
| 2014/0233564 | A1 | 8/2014 | Lue et al. |
| 2015/0237179 | A1 | 8/2015 | Sridhar et al. |
| 2015/0289152 | A1 | 10/2015 | Shanmugam et al. |
| 2016/0149788 | A1* | 5/2016 | Zhang ................. H04L 41/0843 709/224 |
| 2016/0197832 | A1* | 7/2016 | Barry .................... H04L 43/045 370/329 |
| 2016/0212031 | A1 | 7/2016 | Jain et al. |
| 2016/0219024 | A1* | 7/2016 | Verzun ...................... H04L 9/34 |
| 2016/0309345 | A1 | 10/2016 | Tehrani et al. |
| 2017/0063886 | A1* | 3/2017 | Muddu ................ G06K 9/2063 |
| 2017/0099197 | A1 | 4/2017 | Raney |
| 2017/0250889 | A1 | 8/2017 | Vogt et al. |
| 2017/0359735 | A1 | 12/2017 | Jain et al. |
| 2018/0337859 | A1* | 11/2018 | Meilik ................ H04L 43/0829 |
| 2019/0132756 | A1 | 5/2019 | Okada et al. |
| 2019/0259226 | A1 | 8/2019 | Khalifeh et al. |
| 2020/0304397 | A1 | 9/2020 | Smith et al. |
| 2020/0322826 | A1 | 10/2020 | Wangler et al. |
| 2020/0344129 | A1 | 10/2020 | Hild |
| 2021/0119889 | A1 | 4/2021 | Scahill et al. |

FOREIGN PATENT DOCUMENTS

| | | | |
|---|---|---|---|
| CN | 112335203 | A | 2/2021 |
| EP | 1180871 | A2 | 2/2002 |
| EP | 1180871 | A3 | 4/2005 |
| EP | 1180871 | B1 | 11/2007 |
| EP | 2784984 | A1 | 10/2014 |
| EP | 2801937 | A1 | 11/2014 |
| GB | 2527607 | B | 10/2016 |
| GB | 2575246 | A | 1/2020 |
| WO | WO-2012175132 | A1 | 12/2012 |
| WO | WO-2016123383 | A2 | 8/2016 |
| WO | WO-2016123383 | A3 | 9/2016 |
| WO | WO-2017112260 | A1 | 6/2017 |

OTHER PUBLICATIONS

International Search Report and Written Opinion for Application No. PCT/EP2019/066511, dated Aug. 5, 2019, 14 pages.
International Search Report and Written Opinion for Application No. PCT/EP2019/066513, dated Aug. 5, 2019, 16 pages.
Search Report for GB Application No. 1914094.6, dated Jul. 3, 2020, 4 pages.
Seytnazarov S., et al., "Qos-aware adaptive MPDU aggregation of VoIP traffic on IEEE 802.11n WLANs," Nov. 17, 2014, 4 pages.
Examination Report under section 18(3) for GB Application No. GB1810384.6, dated Dec. 10, 2020, 4 pages.
Goldschneider J R., "Lossy Compression of Scientific Data via Wavelets and Vector Quantization," 1997, 204 pages.
Gupta P., "Algorithms for Packet Classification," 29 pages.
GZIP "GNU GZIP: General file (de)compression," Jan. 2018, retrieved https://www.gnu.org/software/gzip/maunal/gzip.html, retrieved on Mar. 28, 2018, 8 pages.
Hansch G., et al., "Packet-wise Compression and Forwarding of Industrial Network Captures," Sep. 21, 2017, 9th IEEE International Conference on Intelligent Data Acquisition and Advanced Computing Systems: Technology and Applications, published on Nov. 7, 2017, 5 pages.
International Search Report and Written Opinion for Application No. PCT/EP2020/075775, dated Dec. 7, 2020, 13 pages.
Office Action for Chinese Application No. 201980042025.9 dated May 20, 2021, 10 pages.
Combined Search and Examination Report under Sections 17 and 18(3) for Great Britain Application No. 1810381.2, dated Dec. 3, 2018, 6 pages.
International Preliminary Report on Patentability for Application No. PCT/EP2020/075775, dated Apr. 14, 2022, 10 pages.
"Communication pursuant to Article 94(3) EPC for European Application No. 20771858.6, dated Jun. 19, 2023".
"First Notification of Office Action and Search Report for Chinese Application No. 201980042172.6, dated Mar. 31, 2023".
"International Preliminary Report on Patentability received for PCT Patent Application No. PCT/EP2019/066511, dated Jan. 7, 2021".
"International Preliminary Report on Patentability received for PCT Patent Application No. PCT/EP2019/066513, dated Jan. 7, 2021".

* cited by examiner

Figure 2: Breakdown of Fields Within an Example Beacon Frame

Figure 3: Replacement of Beacon Frames with Custom Packets

Figure 4: Process Flow-Chart

PROCESSING LOCAL AREA NETWORK DIAGNOSTIC DATA

PRIORITY CLAIM

The present application is a National Phase entry of PCT Application No. PCT/EP2019/066513, filed Jun. 21, 2019, which claims priority from EP Patent Application No. 18179579.0, filed Jun. 25, 2018, each of which is hereby fully incorporated herein by reference.

TECHNICAL FIELD

The present disclosure relates to methods of and systems for processing local area network diagnostic data obtained in respect of a local area network. In particular, embodiments of the disclosure relate to techniques and apparatus for use in relation to the uploading of such diagnostic data from a local area network to (for example) an Internet Service Provider for subsequent analysis, network diagnostics and other such processing.

BACKGROUND

In network diagnostics systems that rely on capturing and analyzing every packet transmitted over a network, the amount of storage, bandwidth and processing required is dependent on both the number of packets captured and the average size of a packet. It is advantageous therefore to reduce both the number of packets and the size of the packets that are captured and processed.

It is common in packet capture or data transmission systems to use compression algorithms such as GZIP compression (discussed later) to reduce the size of packet captures. Compression can be applied on a packet-by-packet basis or across a block of multiple packets depending on the acceptable delay and the desired compression ratio required. GZIP-based packet compression has the advantage of being a lossless compression scheme and ensures that all packets can be recreated perfectly when decompressed, however this limits the maximum amount of compression that is possible.

In IEEE 802.11 based WiFi systems, certain packets are transmitted regularly independently of whether there are active users of the access point in question. For example, WiFi "beacon" packets are transmitted every 100 msecs for each distinct access point BSSID (i.e. Basic Service Set IDentifier) that is operating. For WiFi routers such as the BT "Home Hub", a current version of which supports six independent access points operating in parallel, beacon transmissions can account for 6×10×3600×24=5,184,000 packets per day within the packet capture. Each beacon packet transmitted is essentially identical to all other beacons with the exception of a small set of fields including: the Traffic Indication Map, QBSS (i.e. QOS-enhanced Basic Service Set) Load, Sequence Number and Timestamp elements which may or may not differ between consecutive beacons. Depending on the type of diagnostics performed, these fields may not be relevant, however their presence creates differences between packets which limit the performance of compression algorithms.

Whilst the size of a packet capture affects the amount of storage and bandwidth required to upload the capture, it is (at least primarily) the number of packets within the packet capture that determines how much CPU processing power is required to analyze the packet capture, so it is still advantageous to remove small packets even if this does not make a significant difference to the compressed packet capture file size.

It will be appreciated that the data units in question will generally be regarded as frames in relation to their transfer at Layer 2 according to the OSI Model, and as packets in relation to their transfer at Layer 3, but since the frames in question are encapsulated within packets in order for the data in question to be uploaded as part of a packet capture, the issues above are applicable whether the data units in question are regarded as being frames or packets, in particular since the number and sizes of the packets in a packet capture will depend to a large extent on the number and sizes of the frames they carry.

Referring now to some existing techniques, GZIP (referred to earlier) is a file format and software application used for file compression and decompression. Briefly, GZIP compression uses Liv-Zempel (LZ) compression to replace identical byte sequences in data with a single instance, and is therefore able to compress data very efficiently. LZ algorithms achieve compression by replacing repeated occurrences of data with references to a single copy of that data existing earlier in the uncompressed data stream. A match is encoded by a pair of numbers called a "length-distance pair", which is equivalent to the statement "each of the next [length] characters is equal to the characters exactly [distance] characters behind it in the uncompressed stream". The longer the byte sequences that can be replaced, the more efficient the compression can be.

ZIP compression is a lossless compression technique however, and does not take account of insignificant differences between byte sequences (e.g. fields within packet contents having similar but non-identical values, or fields where the value is variable but unimportant are not compressed). Also, while ZIP-compression can generally reduce the size of packet captures, it does not generally reduce the number of packets after decompression since each packet generally has at least a unique packet number and/or timestamp, so GZIP compression does not necessarily reduce the processing requirements of back-end analytics systems.

More information about GZIP is available online on a web-page entitled "GNU Gzip" available at www.gnu.org and elsewhere.

"Wireshark" provides a data capturing technique that "understands" the structure (i.e. the encapsulation) of various networking protocols. It can parse and display the fields, along with their meanings as specified by different networking protocols. Wireshark uses the "pcap" (packet capture) application programming interface (API) to capture packets, so can only capture packets on the types of networks that "pcap" supports.

Within Wireshark, the "Editcap" functionality is capable of removing duplicate packets ("Packet Deduplication") in a packet capture. To identify identical packets, Wireshark generates a hash-value based on the packet contents and stores the historical hash-values for a configurable historical window defined either by absolute time or by number of packets. If the current packet hash is the same as the hash for any previous packets within the window then the current packet is dropped. The packet hash-function can be configured to ignore a fixed number of bytes from the start of the packet, but this number is the same for all packet types and is a prefix only. Typically this is to allow timestamps and/or frame numbers to be ignored when calculating the packet hash. However the same fixed number of bytes are ignored from all packets. Further, the duplicate packet is removed in Wireshark, and no record is retained of this packet, meaning it cannot be reinstated afterwards even if needed.

A paper by Pankaj Gupta and Nick McKeown entitled "Algorithms for Packet Classification" (IEEE Network: Magazine of Global Internetworking, Vol 15, Issue 2, March 2001, pages 24-32), available online at www.yuba.standord.edu describes packet classification techniques which are used to group packets into semantically similar classes to allow class-specific processing such as traffic-shaping or identification to be applied to the packet. Packet classifiers may use different subsets of the packet fields dependent on the packet type to match a packet to various classes, i.e. a packet classifier may define a similarity measure by which a packet may be compared to other packets.

A paper by Jill R. Goldschneider entitled "Lossy Compression of Scientific Data via Wavelets and Vector Quantization" (February 2000), which is available online at www.ditigal.lib.washington.edu discusses lossy compression for data transmission. In Vector Quantization (VQ) based data compression the packet payloads are replaced with the index of the nearest codebook entry. The VQ algorithm uses a distance/similarity measure to compare payload contents in order to find the nearest codebook entry. Typically a single distance metric is applied to all the payload contents. In a VQ system the codebook is typically predefined and is not dynamically generated from the content, and the system relies on the payloads typically being fixed dimensionality data of a single type (e.g. speech data, image data or sensor data).

Referring now to prior patent documents, U.S. Pat. No. 8,874,741 ("Hassan et al") relates to a home router and remote service provider configured to establish a network tunnel and utilize the network tunnel to remotely manage the home router. The home router and remote service provider may also utilize the network tunnel to remotely manage at least one other device that is locally connected or coupled to the home router.

U.S. Pat. No. 6,041,351 ("Kho") relates to a technique for mitigating network congestion through instruction size reduction. Server instruction to client is stored in most-recently-used (MRU) cache, such that subsequent retransmission attempt of such instruction is detected, avoided, and instead executed locally from cache. Storage performance is tuned optimally to achieve partial avoidance effect according to graphical or text types, and dynamically adaptable as instruction characteristic changes. MRU First-In/First-Out (FIFO) cache provides processors with local checking of new instructions in process for network transmission against most recently executed instructions, thereby avoiding repeat transmissions of instructions already accessible locally. More than one instruction set or packet may also be evaluated, stored and monitored similarly, but instruction subsets may be executed selectively. Each processor maintains same cache information synchronously.

International application WO2016123383 ("Quantum Metric LLC") relates to techniques for compact data storage of network traffic and efficient search thereof. Network traffic may be compared to communications in previous network traffic to identify differences if any. Resource templates may be generated for different (e.g. new) resources identified in network traffic. Storage of the different resources identified in network traffic enables compression of network traffic. Similarity matching may be implemented to improve processing performance for compact storage of network traffic, including determining differences in network traffic for storage.

SUMMARY

As explained earlier, it is common in packet capture or data transmission systems to use compression algorithms such as GZIP compression to reduce the size of packet captures, GZIP-based packet compression being a lossless compression scheme which ensures that all packets can be recreated perfectly when decompressed. In a network diagnostics system, however (as opposed to a communication system), it is not necessarily important to have a lossless version of the original packet capture since the diagnostics and analysis may depend only on subsets of the packet fields which are relevant to the diagnostic analysis. The present inventors have therefore identified an opportunity to exploit this redundant information to reduce the size and/or number of packets in a packet capture used for diagnostic purposes by using lossy compression techniques to improve the level of compression possible.

Aspects and embodiments of the disclosure relate to techniques and apparatus for uploading Local Area Network (LAN) diagnostic data (often referred to as network Packet CAPtures or "PCAPs") from a LAN to (for example) an Internet Service Provider (ISP) for analysis, network diagnostics and other such processing. The uploading of such diagnostic data is generally done via or from a LAN gateway device (such as a LAN router/modem device or "Home Hub"), which is located topologically at the boundary of the LAN, and serves as the entry/exit point for data entering/exiting the LAN.

In particular, embodiments of the disclosure are concerned with the issue of how to reduce the size of network packet captures or other such diagnostic data that are to be uploaded for analysis by an ISP or party acting on behalf of an ISP, possibly using a cloud server. Such packet captures can be large, with high bandwidth and storage requirements, so it is advantageous to use compression before uploading them.

While the data to be uploaded generally includes a significant proportion of similar packets of standard types, the majority of the data within which is not generally relevant to the subsequent diagnostic analysis, standard PCAP analysis techniques generally require uploaded data to be in a standard format, and "expect" these packets to be present and complete (essentially, the correct functioning of the analysis techniques relies on them being present and complete).

According to a first aspect of the disclosure, there is provided a method of processing local area network diagnostic data obtained in respect of a local area network, the local area network having at least one user-device located therein operable to communicate via a local area network gateway device with one or more remote devices in a communications network outside the local area network, the local area network diagnostic data comprising a plurality of data units carrying data relating to performance characteristics of the local area network, said data units comprising fields having field-values stored therein, the method comprising: calculating a data-unit-value for each of a plurality of said data units, the data-unit-value for a data unit being calculated according to a predetermined function of one or more field-values stored in one or more of the fields in the data unit; identifying a first and second data unit from the plurality of data units as being similar according to predetermined criteria in dependence on a comparison of their respective data-unit-values, the second data unit having at least one field-value stored in at least one field which differs from a corresponding field-value stored in at least one corresponding field of the first data unit; in response to such an identification, creating a third data unit comprising at least one field containing a field-value indicative of the first data unit and at least one field containing an indication of the at least one field-value which differs from the corresponding field-value stored in the corresponding field of the first data unit; and sending the first data unit and the third data unit from the local area network for local area network performance analysis at a remote network diagnostic device in the communications network outside the local area network.

According to some embodiments, the local area network diagnostic data comprises a plurality of data units carrying data relating to performance characteristics in respect of communication between the local area network gateway device and the at least one user-device located in the local area network.

According to some embodiments, the local area network diagnostic data obtained in respect of the local area network may comprise a plurality of packets conforming to a predetermined version of a network protocol, which may be a predetermined wireless networking protocol.

According to some embodiments, the local area network diagnostic data obtained in respect of the local area network may comprise a plurality of Beacon packets, said Beacon packets being transmitted repeatedly after predetermined intervals.

According to some embodiments, the method may comprise identifying a plurality of sets of data units from the local area network diagnostic data obtained in respect of the local area network, each set comprising a first and a second data unit identified as being similar in dependence on a comparison of their respective data-unit-values, the second data unit of a set having at least one field-value stored in at least one field which differs from a corresponding field-value stored in at least one corresponding field of the first data unit of the set; in response to each such identification, creating a third data unit comprising at least one field containing a field-value indicative of the first data unit of the set and at least one field containing an indication of the at least one field-value which differs from the corresponding field-value stored in the corresponding field of the first data unit of the set; and sending updated local area network diagnostic data from the local area network for local area network performance analysis at a remote network diagnostic device in the communications network outside the local area network, the updated local area network diagnostic data comprising the first data unit of each set and the third data unit created in respect thereof. By virtue of this, the method may be performed in respect of a "packet capture" comprising a plurality of sets of data units.

According to some embodiments, calculating a data-unit-value for a data unit may comprise calculating the data-unit-value according to a predetermined function of one or more field-values stored in one or more of the fields in the data unit, discounting one or more field-values stored in one or more other fields in the data unit.

According to some embodiments, calculating a data-unit-value for a data unit may comprise calculating the data-unit-value according to a predetermined function of one or more field-values stored in one or more of the fields in the data unit having replaced one or more of said field-values with predetermined values.

According to some embodiments, calculating a data-unit-value for a data unit may comprise calculating the data-unit-value according to a predetermined hash-function of one or more field-values stored in one or more of the fields in the data unit.

According to some embodiments, the method may further comprise inspecting respective data units of the plurality of said data units whereby to determine a data unit type or sub-type for the respective data units from a plurality of possible data unit types or sub-types, the step of calculating a data-unit-value for each of a plurality of data units of a particular data unit type or sub-type comprising calculating said data-unit-values according to a predetermined function selected in dependence on said data unit type or sub-type. Where the data units are packets, such functionality thus allows for different functions to be used for different packet types or sub-types. Where the functions are hash-functions, this allows for different hash-functions to be used for different packet types or sub-types.

According to some embodiments, the method may further comprise inspecting respective data units of the plurality of said data units whereby to determine a data unit type or sub-type for the respective data units from a plurality of possible data unit types or sub-types, the step of identifying a first and second data unit from the plurality of data units as being similar comprising identifying said first and second data unit as being similar in dependence on a comparison of their respective data-unit-values using a comparison algorithm selected in dependence on said data unit type or sub-type. Where the data units are packets, such functionality thus allows for different comparison algorithms to be used for different packet types or sub-types.

According to some embodiments, the method may further comprise receiving the first data unit and the third data unit at the remote network diagnostic device; inspecting the third data unit; and in response to identifying the field-value therein indicative of the first data unit, generating a data unit corresponding to the second data unit in dependence on the at least one field containing an indication of the at least one field-value which differs from the corresponding field-value stored in the corresponding field of the first data unit. In such embodiments, the method may further comprise performing local area network performance analysis at said remote network diagnostic device in dependence on the received first data unit and on the generated data unit corresponding to the associated second data unit.

According to a second aspect of the some, there is provided apparatus for processing local area network diagnostic data obtained in respect of a local area network, the local area network having at least one user-device located therein operable to communicate via a local area network gateway device with one or more remote devices in a communications network outside the local area network, the local area network diagnostic data comprising a plurality of data units carrying data relating to performance characteristics of the local area network, said data units comprising fields having field-values stored therein, the apparatus comprising one or more processors configured to: calculate a data-unit-value for each of a plurality of said data units, the data-unit-value for a data unit being calculated according to a predetermined function of one or more field-values stored in one or more of the fields in the data unit; identify a first and second data unit from the plurality of data units as being similar according to predetermined criteria in dependence on a comparison of their respective data-unit-values, the second data unit having at least one field-value stored in at least one field which differs from a corresponding field-value stored in at least one corresponding field of the first data unit; in response to such an identification, create a third data unit comprising at least one field containing a field-value indicative of the first data unit and at least one field containing an indication of the at least one field-value which differs from the corresponding field-value stored in the corresponding field of the first data unit; and send the first data unit and the third data unit from the local area network for local area network performance analysis at a remote network diagnostic device in the communications network outside the local area network.

Such apparatus may comprise one or more modules in or associated with the local area network gateway device.

According to a third aspect of the some, there is provided a computer program element comprising computer program code to, when loaded into a computer system and executed thereon, cause the computer to perform the method according to the first aspect.

The various options and embodiments referred to above in relation to the first aspect are also applicable in relation to the second and third aspects.

Some embodiments of the disclosure address a desire to reduce the size of network packet captures that are collected at endpoints and uploaded to cloud servers for analysis and network diagnostics. Such packet captures can be large and require significant bandwidth and storage requirements. Whilst standard compression algorithms and utilities such as Linux GZIP can be used to compress such packet captures these files can still be 100 MBs per day after compression.

Some embodiments of the disclosure provide a "lossy" compression scheme which enables packet captures to be compressed at high compression ratios before upload by identifying such "similar" standard packets, replacing the second of a pair of similar packets with a "bespoke" packet which simply contains a reference to the first packet of the pair and any necessary data by which the second differs from the first, then uploading the first packet and the "bespoke" packet (discarding the second packet). This enables "replaced" packets to be regenerated after uploading from the LAN, thereby enabling the PCAP data to be processed using standard techniques that "expect" full, standard PCAP file formats.

Some embodiments of the disclosure address a desire to reduce the storage, transmission bandwidth and computing resources needed to capture, store and process network packet captures used for network diagnostics. They use a lossy packet compression scheme which exploits knowledge of the network protocols of the packets being captured, and knowledge of the type of network diagnostic analysis to be performed, to reduce the size of packet captures prior to upload whilst retaining the ability to generate the same diagnostic results as if those packets had been included, and importantly to enable the regeneration of a packet capture with packets corresponding to all the original packets present, albeit with some of these packets containing field values that may differ from the original packets (albeit only in insignificant features, fields or ways).

This is advantageous because these packet captures may be used by other users and/or software systems which may depend on the packet capture files containing (or at least appearing to contain) all of the original packet types in their correct order, meaning that it is advantageous for any compression scheme to enable the original packet capture to be recreated as closely as possible, hence unlike standard de-duplication, the presence of the original packet is recorded so that it (or a packet corresponding to it, at least) can be recreated if subsequently needed.

Some embodiments of the disclosure include a number of mechanisms that exploit knowledge of the operation of specific network protocols such as 802.11 WiFi combined with knowledge of the type of information required by for example WiFi diagnostics systems to enable much higher degrees of packet capture compression than are generally possible with standard compression techniques.

In some packet-based diagnostic systems it is necessary for ISPs to collect packet captures on remote endpoints such as router/modem or "home-hub" type devices. These endpoints may have limited storage, and may be connected via links of various (and possibly variable) quality levels ranging from ADSL through to FTTP connections. Reducing the storage and bandwidth requirement on the endpoints can reduce the cost of deploying packet-based diagnostic systems. Also, where large numbers of endpoints are connecting to a cloud-based diagnostic platform, reducing bandwidth requirements for the upload of packet captures can have substantial cost benefits in terms of the cost and capacity of network links and data-center equipment needed.

BRIEF DESCRIPTION OF THE DRAWINGS

Embodiments of the present disclosure will now be described with reference to the appended drawings, in which.

DETAILED DESCRIPTION

With reference to the accompanying figures, methods and apparatus according to various embodiments will be described.

Figure 1:
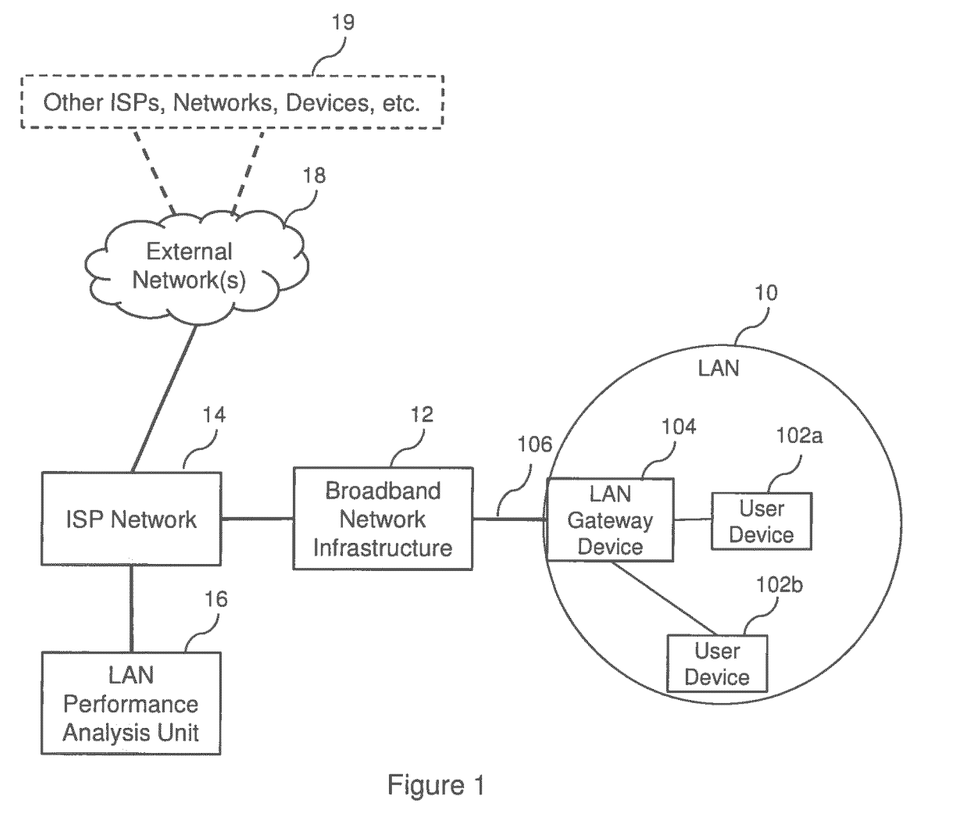
FIG. 1 shows a Local Area Network and entities and other networks with which devices in such a Local Area Network may communicate.

Referring first to FIG. 1, this shows a Local Area Network (LAN) 10 within which are one or more user devices 102a, 102b such as computers, smart-phones, internet-enabled televisions etc. (generally 102) and a LAN gateway device 104, which may comprise a LAN router/modem device or "Home Hub" and/or other Network Termination Equipment (NTE). The user devices 102 may communicate via wired or wireless connections with the LAN gateway device 104, but in the present example, the LAN gateway device 104 is also capable of operating as the wireless hub of a wireless LAN. The LAN gateway device 104 is located topologically at the boundary of the LAN 10, and serves as the entry/exit point for data entering/exiting the LAN when a user device 102 within the LAN communicates with a device in a network outside the LAN.

In the present example, the LAN gateway device 104 is in communication via a connection 106 with broadband network infrastructure 12. The connection 106 may for example be a Dynamic Subscriber Line (DSL) connection over a public switched telephone network (PSTN) line or otherwise, in which case the broadband network infrastructure 12 may include a Digital Subscriber Line Access Multiplexer (DSLAM) with an associated element manager allowing the performance of the DSL connection to be monitored and adjusted by way of Dynamic Line Management (DLM) techniques. Alternatively, the connection 106 may be a fiber connection, or otherwise.

In the present example, irrespective of the type of broadband connection, the broadband network infrastructure 12 is generally in communication with an Internet Service Provider (ISP) network 14, via which a user device 102 in the LAN 10 (and other devices in the ISP network 14) may communicate via one or more other external networks 18 (e.g., the Internet) with servers and other devices 19 in other networks (e.g. other ISP networks, etc.). In an alternative example, the network in question may be a corporate network, possibly across multiple sites, in which case the network infrastructure via which the individual sites are in communication with each other and/or with external networks 18 and other devices 19 (including a LAN performance analysis unit 16, to be discussed below) may be a corporate Wide Area Network (WAN) or similar, for example, rather than the broadband network infrastructure 12 and ISP network 14 shown in FIG. 1.

Also shown in FIG. 1 is a LAN performance analysis unit 16. This is shown as being in communication with the ISP network 14, but it may in fact be within the ISP network 14, or located elsewhere. It may be under the control of the ISP, but may alternatively be a separate entity in communication therewith or otherwise in communication with the LAN gateway device 104 in the LAN 10. A primary role of the LAN performance analysis unit 16 is to receive diagnostic data obtained in respect of one or more LANs such as LAN 10, generally in the form of packet captures, and carry out performance and/or other diagnostic analysis and/or other processing in respect of the LAN diagnostic data.

As explained earlier, the size of a packet capture affects the amount of storage and bandwidth required to upload the packet capture to the ISP or to whichever entity is to receive and process the diagnostic data therein, so it is advantageous if the size of the packet capture (measured in bytes, for example) can be reduced prior to the packet capture being sent from the LAN gateway device 104 (or other device in the LAN 10) to the ISP or other such processing entity, provided this can be done in such a way as to preserve the "relevant" information contained in the packet capture (i.e. information of relevance to any subsequent diagnostic analysis), ideally preserving it in a form that allows the necessary processing to be performed using standard performance analysis techniques.

As well as the size of the packet capture affecting the amount of storage and bandwidth required to upload the packet capture, the number of packets within a packet capture is also significant, as it is a significant factor in determining how much CPU processing power is required to analyze and otherwise process the packet capture, so it is in fact advantageous to remove small (i.e. in terms of number of bytes) packets even if this does not make a significant different to the compressed packet capture file size.

Figure 2:
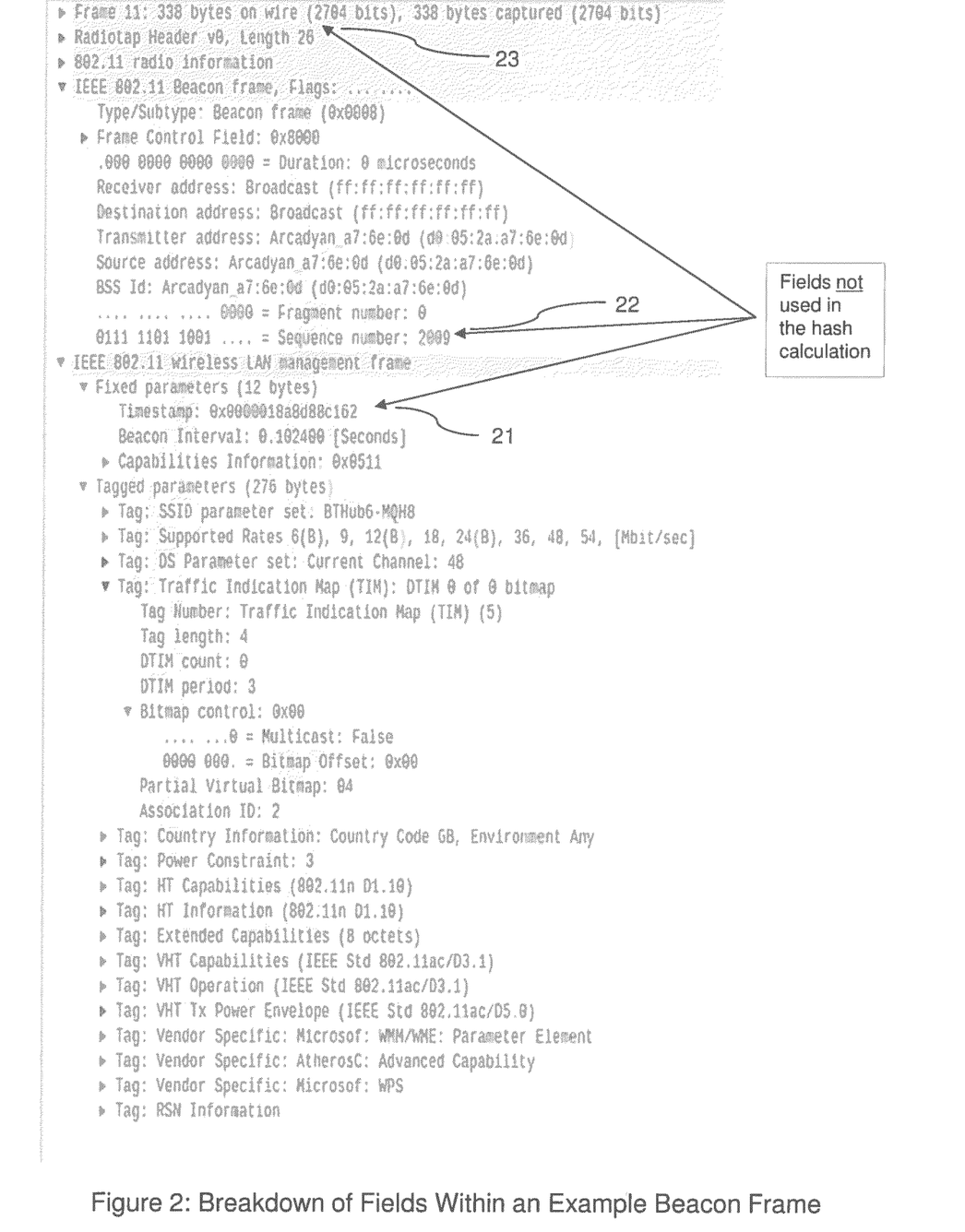
FIG. 2 shows an example of the breakdown of fields within a beacon frame.

Referring to FIG. 2 (and for now ignoring the annotation concerning the "fields not used in the hash calculation"), this shows an example of the breakdown of the fields within an exemplary "beacon" frame. As explained earlier, each beacon is essentially identical to all other beacons with the exception of a small set of fields including: the Traffic Indication Map, QBSS (i.e. QOS-enhanced Basic Service Set) Load, Sequence Number and Timestamp elements which may or may not differ between consecutive beacons. These fields may not be relevant for the purpose of network performance diagnostics, but their presence creates differences between frames (or packets to be transmitted) which in general would limit the performance of compression algorithms.

It is known from a review of example PCAP sizes that "beacons" can account for a significant proportion of the data within a packet capture, especially a packet capture which uses variable "Snap Lengths" to ensure that the complete beacon frame is captured.

(NB The "Snap Length" or snapshot length ("SnapLen") is the amount of data for each frame that is actually captured by a network capturing tool and stored into a Capture File.)

In a typical example, a 24-hour compressed PCAP including full beacon packets was found to have a size of 337 MB, whereas a 24-hour compressed PCAP without beacons was found to have a size of 231 MB.

Beacons generally account for approximately 30% of the total data size, yet they are mostly the same frames or packets repeated. Improving the compression of beacon frames therefore offers the potential for significant data savings.

Various embodiments of the disclosure exploit knowledge of the operation of specific network protocols such as 802.11 WiFi, combined with knowledge of the type of information required by, for example, WiFi diagnostics systems, to enable much higher degrees of packet capture compression than are generally possible with standard compression techniques.

For data including at least some similar (but not necessarily identical) packets separated (generally) in time and by intervening packets (for example Beacons), methods according to preferred embodiments may be used to enable improved compression of the data by exploiting the general similarity of the similar packets.

Lossy Packet Compression

According to some embodiments, one or more packets which are identical or near-identical to a "first" packet in a packet capture (for example, those carrying beacon frames) are replaced with newly-created reduced-size "custom" packets before the (revised, reduced-size) packet capture containing the "first" packet and the one or more reduced-size "custom" packets is compressed and uploaded from the Local Area Network (LAN) (i.e. generally from the LAN gateway device such as a LAN router/modem device or "Home Hub", which is generally located topologically at the boundary of the LAN and serves as the entry/exit point for data entering/exiting the LAN) to an Internet Service Provider (ISP) or other entity for analysis, network diagnostics and other such processing. Each "custom packet" contains an indication of the identity of the first data unit to which the packet it replaces is similar, and an indication of one or more field-values by virtue of which the packet it replaces differs from the corresponding field-values of the first packet.

This technique makes use of a capability to infer the contents of replaced packets based on the contents of unaltered "first" packets that remain present in the (revised, reduced) packet capture that is compressed and uploaded from the LAN.

In general, and with reference again to FIG. 1 in particular, methods according to various embodiments involve processing of diagnostic data obtained in respect of a local area network such as LAN 10, the LAN having at least one user-device such as user device 102a which is able to communicate via a LAN gateway device 104 (such as a router/modem device or "Home Hub") with other devices 19 outside the LAN. The processing, which is generally performed prior to the uploading of the diagnostic data to a remotely-located performance analysis unit 16 for subsequent analysis (generally by or on behalf of an ISP) may be performed by the LAN gateway device 104 or by an associated device. The diagnostic data to be processed may be in the form of standard packet captures, and comprises data relating to performance characteristics of the LAN, the data including data units of a type (or sub-type) at least some of which are expected to conform to a format such as to be near-identical. The processing method performed by the LAN gateway device 104 or otherwise comprises calculating a data-unit-value for each of a plurality of said data units (or for each of a plurality of said data units of a particular type, or sub-type), the data-unit-value for a data unit being calculated according to a predetermined function of one or more field-values stored in one or more of the fields in the data unit, then identifying a first and second data unit from the plurality of data units as being similar (or "near-identical") in dependence on a comparison of their respective data-unit-values, such that the second data unit may be deemed similar "similar" (or "near-identical") to the first data unit while having at least one field-value stored in at least one field which differs from a corresponding field-value stored in at least one corresponding field of the first data unit.

As indicated earlier, examples of possible "similar" or "near-identical" data units for the purposes of identifying such first and second data units include beacon frames.

Embodiments of the disclosure may be applicable in relation to other types of similar or near-identical data units (i.e. data units other than beacons). Other examples would include broadcast probe requests and probe responses. A probe request is a special frame sent by a client station requesting information either from a specific access point specified by Service Set IDentifier (SSID), or from all access points in the area, specified with the broadcast SSID. The information requested generally includes the supported data rates (also included in beacon frames typically broadcast from an access point). Generally, when an access point hears a probe request frame (either directed at the specific access point or broadcast to all stations in the area using the broadcast SSID), it sends out a probe response. Similar to beacon frames, probe responses contain much of the same information required for two stations to begin communicating. As with beacons, he fields by virtue of which such broadcast probe requests and probe responses may differ from each other are standardized, meaning that near-identical probe requests and/or probe responses in a packet capture can be identified and replaced with reduced-size "custom" packets before the packet capture is uploaded from the Local Area Network (LAN).

Having identified such a first and second data unit, the processing method then comprises creating a third data unit comprising at least one field containing a field-value indicative of the first data unit and at least one field containing an indication of the at least one field-value which differs from the corresponding field-value stored in the corresponding field of the first data unit (noting that while the "first data unit" may be the earlier-received of the two, it need not be—the words "first" and "second" need not imply a temporal relationship—they are simply terms allowing each of the data units to be referred to separately). The processing method then comprises sending the first data unit and the third data unit from the LAN 10 for performance analysis at a remote network diagnostic device 16 outside the LAN. The second data unit is essentially replaced by the (reduced-size) third data unit prior to compression and uploading of the packet capture.

In such methods, a set of packet similarity measures may be used to compare the current packet to one or more previously-observed packets of the same WLAN type/subtype.

The similarity test may compare a hash-value (created using a hash-function such as the "MD5" algorithm, for example) calculated for the current packet content to a list of hash-values calculated for earlier packets of the same type/subtype (e.g. Management/Beacon). Unlike other de-duplication approaches, the hash-value may be calculated over a variable subset of the frame content where the subset is dependent on the packet type/subtype (i.e. the hash-function for IEEE 802.11 Beacon frames may be different to that for IEEE 802.11 Probe response, etc.). Such a hash-function may therefore embody the knowledge of what is considered important packet information for diagnostics purposes.

Referring again to FIG. 2, this shows an example of the breakdown of the fields within an exemplary beacon frame, and includes an annotation indicating certain fields which in this example are not used to compute the beacon's hash-value.

Figure 4:
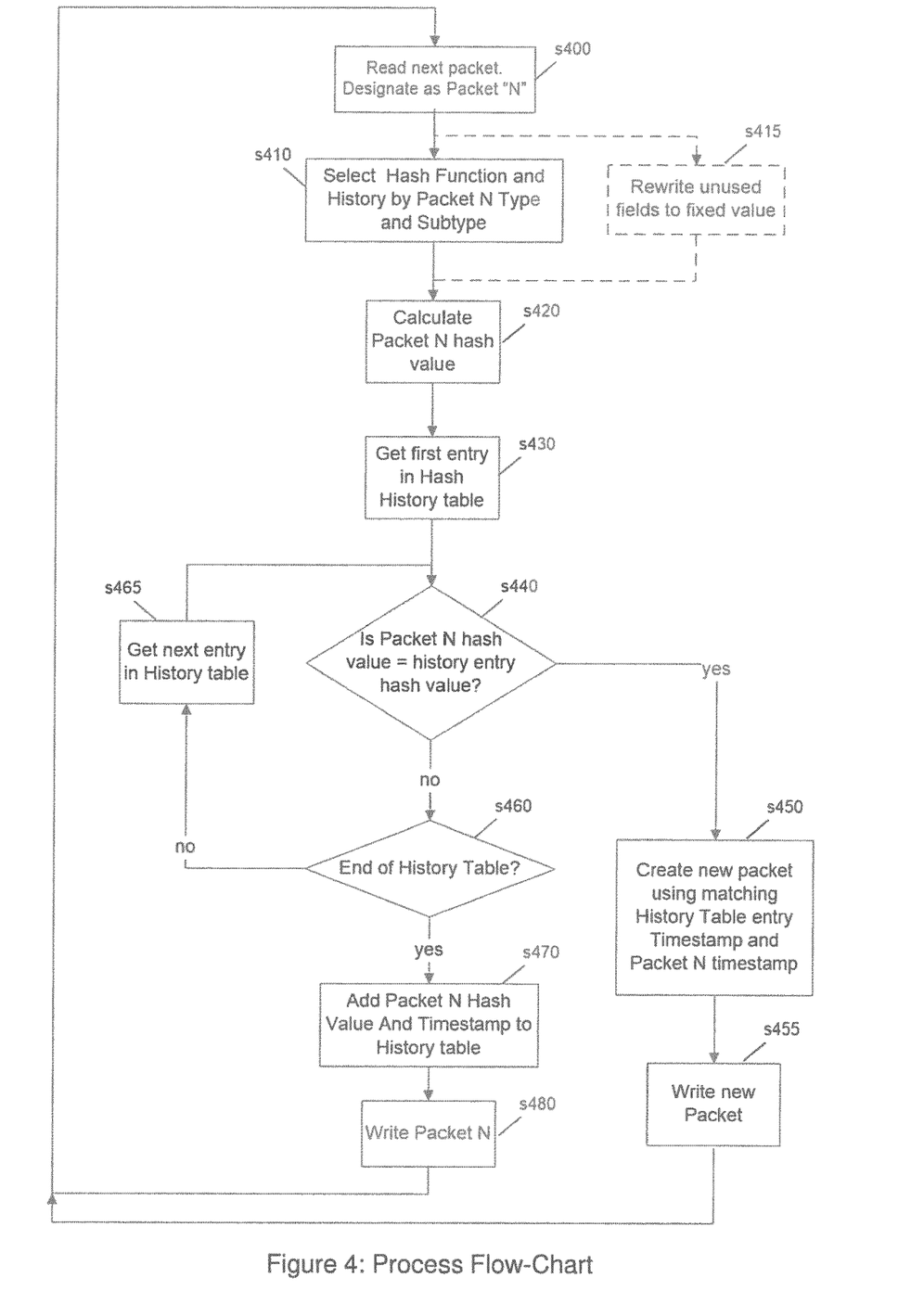
FIG. 4 is a flow-chart illustrating a process for the replacement of beacon frames with custom packets according to an embodiment.

(NB An alternative approach here, which will be discussed in more detail later with reference to s415 in FIG. 4, is to rewrite the values in the packet type/subtype specific unused fields to be fixed values, then calculate a hash-value using a single hash-function independent of packet type/subtype. The packet type specific knowledge is embodied in the field rewrite function rather than the hash-function.)

A Beacon frame contains a number of fields which vary between Beacon packets but which are not currently or generally used for network diagnostics, for example the Timestamp field 21 within the FixedParameters InformationElement, which is a timestamp set by the original transmitter and so varies from one Beacon packet to the next, the Sequence Number 22, and frame information such as Frame Number 23, or information such as signal strength. The set of excluded fields may be dependent on the WiFi frame type/subtype field.

A separate packet hash history is maintained for each packet type/subtype, i.e. Beacon packet hash-values are generally only compared to hash-values for earlier Beacons in order to prevent accidental overlaps between the hash-value ranges. This also allows different hash list lengths to be used for different packet types, enabling greater packet removal rates for packets such as Beacons that are expected to be consistent over longer periods of time.

Example Hash History for type=Management.Subtype=Beacon

| Entry | Packet Timestamp | MD5 Hash-Value |
|---|---|---|
| 1 | 150439760.012342 | 5a5af9e0739a10ed89da5d823fd9a5ef |
| 2 | 150439760.125672 | 7fdfaf9e275da10ed89da5d823fd98672 |

If a match is found between the current packet hash-value and an entry in the hash history then a custom packet is created containing the current packet timestamp and the timestamp of the matching hash stored in the hash history.

Custom Packet Format:

| EncapsulationType | Custom | 8 bit |
|---|---|---|
| Epoch Time: | 150439821.230024 | 64 bit |
| EarlierPacketTimestamp: | 150439760.012342 | 64 bit |

Custom packets may therefore replace, for example, a beacon frame which is typically greater than 300 bytes with a 17 byte custom frame which contains a reference (i.e. the timestamp, for example) to the earlier similar packet found earlier in the packet capture.

Figure 3:
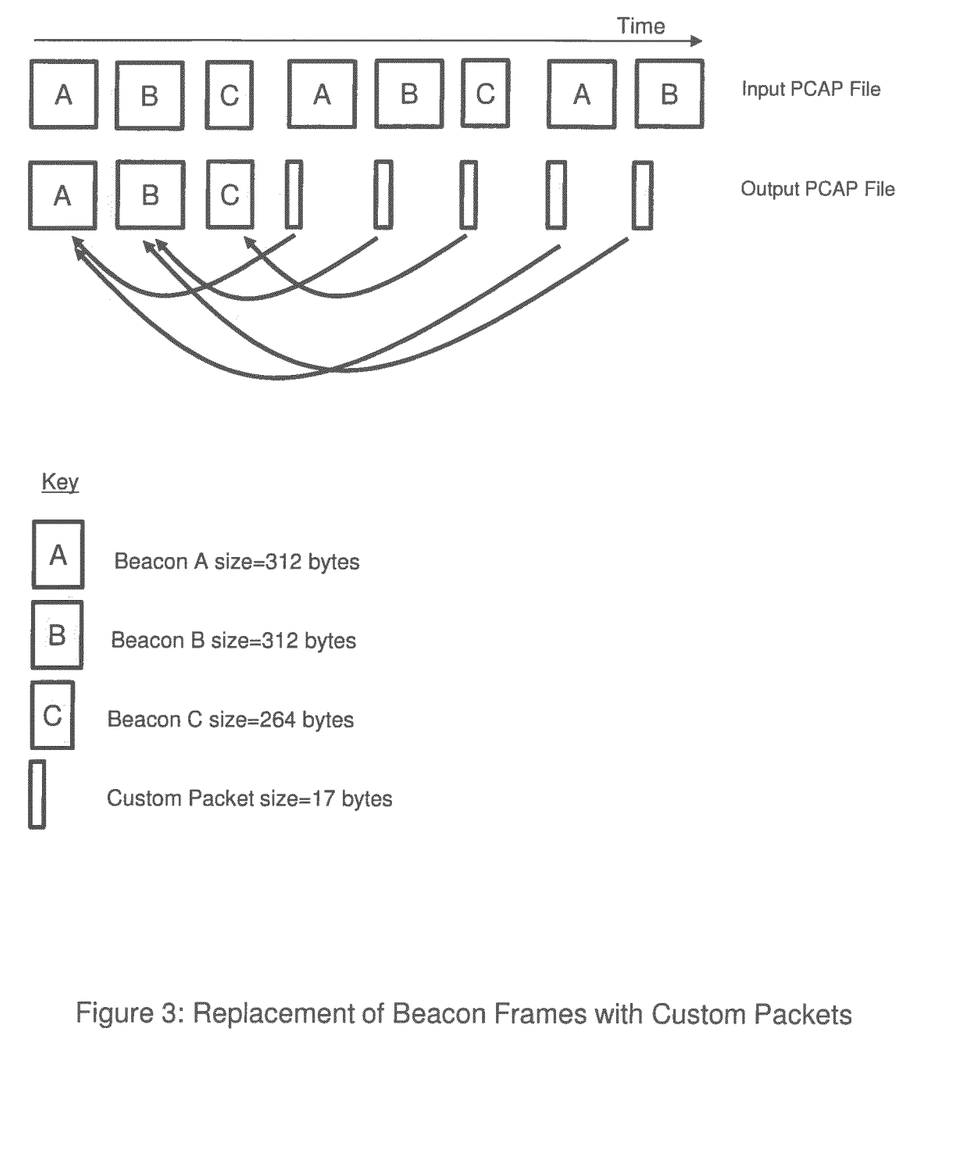
FIG. 3 illustrates the replacement of beacon frames with custom packets.

Referring to FIG. 3, this illustrates the replacement of beacon frames with custom packets according to the technique set out above. In this, an input PCAP file is shown with beacon frames of three types (A, B and C) arriving in succession. Beacons of type A and B each have a similar size (312 bytes) but may differ from each other in other respects, while beacons of type C each have a slightly smaller size (264 bytes). (This may be the case in relation to private and public SSID beacons from a wireless router device, for example, where private SSID beacons may be slightly larger than public SSID beacons.) Identification of subsequent beacons of type A allow these to be replaced in the output PCAP file with custom packets including a reference to the first beacon of type A (and indications of any other differences between them and the first beacon of type A). Similarly, subsequent beacons of types B or C are replaced in the output PCAP file with custom packets including references to the first beacon of the respective type (i.e. B or C) and indications of any other differences between them and the first beacon of that type.

Each custom packet (irrespective of the type of packet it replaces) is of a much smaller size (17 bytes) than the frame it replaces.

If the replaced packet needs to be regenerated after the packet capture has been uploaded to a diagnostic system, this can be done based on the indications in the custom packet of the identity of the "first beacon" to which the beacon it replaces is similar, and of the one or more field-values by virtue of which the beacon it replaces differs from the corresponding field-values of the "first beacon".

It is advantageous that the hash/rewrite functions are configurable, enabling the hash-function and/or rewrite policy to be changed should the fields deemed important for diagnostic purposes change.

FIG. 4 is a flow-chart illustrating a process for the replacement of beacon frames with custom packets according to one embodiment, such that they can be regenerated after a packet capture has been uploaded from a Local Area Network. Such a process may be performed by or on behalf LAN gateway device 104, for example. It will be appreciated that the process may be performed in respect of beacon frames (and packets embodying them) and/or other types of frames and/or packets, but these other options are not shown in the flow-chart in order to avoid unnecessary complexity.

Starting from s400, the first packet (referred to as "Packet N") of a packet capture of local area network diagnostic data obtained in respect of the LAN is read. At s410, a Hash-Function and History is selected for packets of the Type (and if appropriate, Subtype) of Packet N.

(NB Also shown is s415, which is an alternative to s410 discussed earlier, in which unused fields are re-written to a fixed value. In this alternative approach, the values in the packet type- and/or subtype-specific unused fields are rewritten such that these fields carry fixed, predetermined values (so that they themselves will not influence the result of the "similarity" assessment based on the hash-value to be calculated), then a hash-value is calculated using a single hash-function which may be independent of the packet-type and/or subtype in question. The packet-type specific knowledge is essentially embodied in the field rewrite function rather than the hash-function.)

At s420, the hash-value of Packet N is calculated using the applicable hash-function (i.e. selected based on the packet-type and/or subtype of the packet if using a method that has proceeded via the option of s410, or using a hash-function which may be independent of the packet-type and/or subtype if using a method that has proceeded via the option of s415).

At s430, the first entry in a table of hash-values calculated for previous packets (of the packet-type and/or subtype of Packet N, if applicable) is obtained.

At s440 it is determined if the hash-value calculated for Packet N is equal to the first hash-value in the table of historic hash-values. If so, it is concluded that Packet N is similar enough to that packet to be replaced by a custom packet, and the process continues to s450, discussed later. If not, the process proceeds to s460 at which a check is made as to whether the entry currently under consideration in the table is the last. If it is not the last, the process continues to s465 at which the next entry is obtained from the History table, and it is determined if the hash-value calculated for Packet N is equal to this next entry. If it is found at s460 that the entry currently under consideration is the last in the table, it is concluded that Packet N is not similar enough to any packet already reflected in the History table to be replaced by a custom packet, and the process continues to s470, at which the hash-value calculated for Packet N is itself added to History table together with its timestamp. The process then proceeds to s480, at which Packet N is written and can be uploaded as part of the packet capture.

The process can then return to s400 and perform corresponding steps in respect of the next packet of a packet capture of local area network diagnostic data obtained in respect of the LAN, now referring to this next packet as "Packet N".

Returning now to the "yes" option at s440, as stated earlier, if it is determined that the hash-value calculated for Packet N is equal to a hash-value in the table of historic hash-values such that it can be concluded that Packet N is similar enough to a previous packet in respect of which there is an entry in the History table, the process continues to s450. At s450, a new "custom" packet is created using the matching History table entry, the custom packet including the Timestamp of the previous packet in question (as an indication of that packet) and the Timestamp of Packet N (in order to enable this information to be maintained when Packet N is replaced by the custom packet). The process then proceeds to s455, at which the new custom packet to replace Packet N is written, and this custom packet can then be uploaded as part of the packet capture.

The process can then return to s400 and perform corresponding steps in respect of the next packet of a packet capture of local area network diagnostic data obtained in respect of the LAN as explained before, again referring to this next packet as "Packet N".

Figure 5:
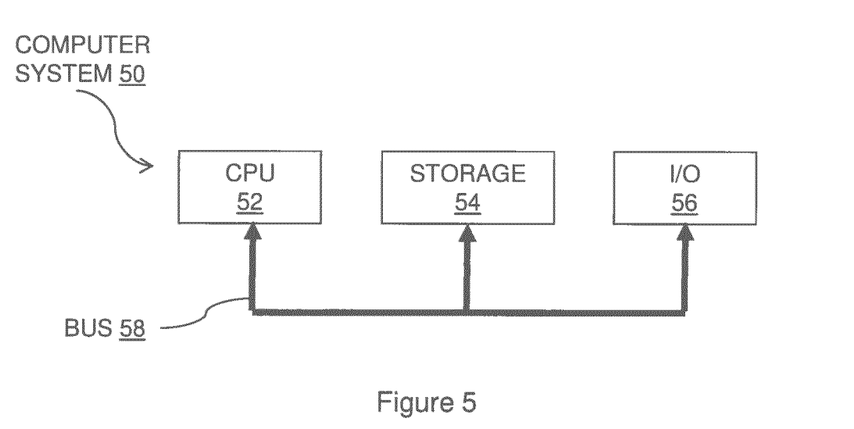
FIG. 5 is a diagram of a computer system suitable for the operation of embodiments of the disclosure or components thereof.

FIG. 5 is a diagram of a computer system 50 suitable for the operation of embodiments of the disclosure or components thereof. A central processor unit (CPU) 52 is communicatively connected to a data store 54 and an input/output (I/O) interface 56 via a data bus 58. The data store 54 can be any read/write storage device or combination of devices such as a random access memory (RAM) or a non-volatile storage device, and can be used for storing executable and/or non-executable data. Examples of non-volatile storage devices include disk or tape storage devices. The I/O interface 56 is an interface to devices for the input and/or output of data. Examples of I/O devices connectable to I/O interface 56 include a keyboard, a mouse, a display (such as a monitor) and a network connection.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the disclosure.

The scope of the disclosure may include other novel features or combinations of features disclosed herein. The applicant hereby gives notice that new claims may be formulated to such features or combinations of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of analyzing performance of a local area network (LAN) by processing LAN diagnostic data obtained in respect of the LAN, the LAN having at least one user-device located therein operable to communicate via a LAN gateway device with one or more remote devices in a communications network outside the LAN, the LAN diagnostic data comprising a plurality of data units carrying data relating to performance characteristics of the LAN, the plurality of data units comprising fields having field-values stored therein, the method comprising:

calculating, using the LAN gateway device, a data-unit-value for each of the plurality of data units, the data-unit-value for a data unit being calculated according to a predetermined function of one or more field-values stored in one or more of the fields in the data unit;

identifying, using the LAN gateway device, a first data unit and a second data unit from the plurality of data units as being similar according to predetermined criteria in dependence on a comparison of respective data-unit-values, the second data unit having at least one field-value stored in at least one field which differs from a corresponding field-value stored in at least one corresponding field of the first data unit;

in response to such an identification, creating, using the LAN gateway device, a third data unit comprising at least one field containing a field-value indicative of the first data unit and at least one field containing an indication of the at least one field-value which differs from the corresponding field-value stored in the corresponding field of the first data unit; and then sending, using the LAN gateway device, the first data unit and the third data unit from the LAN for LAN performance analysis by a remote network diagnostic device in the communications network outside the LAN.

2. The method according to claim 1, wherein the LAN diagnostic data obtained in respect of the LAN comprises a plurality of packets conforming to a predetermined version of a network protocol.

3. The method according to claim 1, wherein the LAN diagnostic data obtained in respect of the LAN comprises a plurality of packets conforming to a predetermined wireless networking protocol.

4. The method according to claim 1, wherein the LAN diagnostic data obtained in respect of the LAN comprises a plurality of Beacon packets, the plurality of Beacon packets being transmitted repeatedly after predetermined intervals.

5. The method according to claim 1, further comprising:

identifying, using the LAN gateway device, a plurality of sets of data units from the LAN diagnostic data obtained in respect of the LAN, each set comprising a first data unit and a second data unit identified as being similar in dependence on a comparison of their respective data-unit-values, the second data unit of a set having at least one field-value stored in at least one field which differs from a corresponding field-value stored in at least one corresponding field of the first data unit of the set;

in response to each such identification, creating, using the LAN gateway device, a third data unit comprising at least one field containing a field-value indicative of the first data unit of the set and at least one field containing an indication of the at least one field-value which differs from the corresponding field-value stored in the corresponding field of the first data unit of the set; and sending, using the LAN gateway device, updated LAN diagnostic data from the LAN for LAN performance analysis by a remote network diagnostic device in the communications network outside the LAN, the updated LAN diagnostic data comprising the first data unit of each set and the third data unit created in respect thereof.

6. The method according to claim 1, wherein calculating a data-unit-value for a data unit comprises calculating the data-unit-value according to a predetermined function of one or more field-values stored in one or more of the fields in the data unit, discounting one or more field-values stored in one or more other fields in the data unit.

7. The method according to claim 1, wherein calculating a data-unit-value for a data unit comprises calculating the data-unit-value according to a predetermined function of one or more field-values stored in one or more of the fields in the data unit having replaced one or more of the field-values with predetermined values.

8. The method according to claim 1, wherein calculating a data-unit-value for a data unit comprises calculating the data-unit-value according to a predetermined hash-function of one or more field-values stored in one or more of the fields in the data unit.

9. The method according to claim 1, further comprising:
inspecting, using the LAN gateway device, respective data units of the plurality of the data units whereby to determine a data unit type or sub-type for the respective data units from a plurality of possible data unit types or sub-types, the calculating of a data-unit-value for each of the plurality of data units of the particular data unit type or sub-type comprising calculating the data-unit-values according to a predetermined function selected in dependence on the data unit type or the sub-type.

10. The method according to claim 1, further comprising:
inspecting, using the LAN gateway device, respective data units of the plurality of the data units whereby to determine a data unit type or sub-type for the respective data units from a plurality of possible data unit types or sub-types, the identifying the first data unit and the second data unit from the plurality of data units as being similar comprising identifying the first data unit and the second data unit as being similar in dependence on a comparison of their respective data-unit-values using a comparison algorithm selected in dependence on the data unit type or the sub-type.

11. The method according to claim 1, further comprising:
receiving the first data unit and the third data unit at the remote network diagnostic device;
inspecting the third data unit at the remote network diagnostic device; and
in response to identifying the field-value therein indicative of the first data unit, generating at the remote network diagnostic device, a data unit corresponding to the second data unit in dependence on the at least one field containing an indication of the at least one field-value which differs from the corresponding field-value stored in the corresponding field of the first data unit.

12. The method according to claim 11, further comprising:
performing LAN performance analysis at the remote network diagnostic device in dependence on the received first data unit and on the generated data unit corresponding to the associated second data unit.

13. An apparatus for analyzing performance of a local area network (LAN) by processing LAN diagnostic data obtained in respect of the LAN, the LAN having at least one user-device located therein operable to communicate via a LAN gateway device with one or more remote devices in a communications network outside the LAN, the LAN diagnostic data comprising a plurality of data units carrying data relating to performance characteristics of the LAN, the plurality of data units comprising fields having field-values stored therein, the apparatus comprising:
one or more processors configured to:
calculate, using the LAN gateway device, a data-unit-value for each of the plurality of data units, the data-unit-value for a data unit being calculated according to a predetermined function of one or more field-values stored in one or more of the fields in the data unit;
identify, using the LAN gateway device, a first data unit and a second data unit from the plurality of data units as being similar according to predetermined criteria in dependence on a comparison of respective data-unit-values, the second data unit having at least one field-value stored in at least one field which differs from a corresponding field-value stored in at least one corresponding field of the first data unit;
in response to such an identification, create, using the LAN gateway device, a third data unit comprising at least one field containing a field-value indicative of the first data unit and at least one field containing an indication of the at least one field-value which differs from the corresponding field-value stored in the corresponding field of the first data unit; and then
send, using the LAN gateway device, the first data unit and the third data unit from the LAN for LAN performance analysis by a remote network diagnostic device in the communications network outside the LAN.

14. The apparatus according to claim 13, further comprising one or more modules in or associated with the LAN gateway device.

15. A non-transitory computer-readable storage medium storing a computer program element comprising computer program code to, when loaded into a computer system and executed thereon, cause the computer system to perform the method as claimed in claim 1.

* * * * *